US006785689B1

United States Patent
Daniel et al.

(10) Patent No.: US 6,785,689 B1
(45) Date of Patent: Aug. 31, 2004

(54) CONSOLIDATION OF MULTIPLE SOURCE CONTENT SCHEMAS INTO A SINGLE TARGET CONTENT SCHEMA

(75) Inventors: Jerald A. X. Daniel, Bangalore (IN); Manjunath M. Bellare, Bangalore (IN); Natarajan Chandramouli, Bangalore (IN)

(73) Assignee: i2 Technologies US, Inc., Dallas, TX (US)

( * ) Notice: Subject to any disclaimer, the term of this patent is extended or adjusted under 35 U.S.C. 154(b) by 319 days.

(21) Appl. No.: 10/008,733

(22) Filed: Dec. 5, 2001

Related U.S. Application Data

(60) Provisional application No. 60/301,950, filed on Jun. 28, 2001.

(51) Int. Cl.[7] .......................... G06F 17/00; G06F 17/30
(52) U.S. Cl. ............................ 707/102; 707/3; 707/100
(58) Field of Search ............................ 707/3, 6–7, 100, 707/102, 103 R, 103 Y, 101, 104.1

(56) References Cited

U.S. PATENT DOCUMENTS

| | | | | |
|---|---|---|---|---|
| 5,806,066 A | * | 9/1998 | Golshani et al. | 707/100 |
| 5,937,410 A | * | 8/1999 | Shen | 707/103 R |
| 5,970,490 A | * | 10/1999 | Morgenstern | 707/10 |
| 6,167,405 A | * | 12/2000 | Rosensteel et al. | 707/102 |
| 6,199,059 B1 | * | 3/2001 | Dahan et al. | 707/3 |
| 6,615,220 B1 | * | 9/2003 | Austin et al. | 707/104.1 |
| 6,704,747 B1 | * | 3/2004 | Fong | 707/100 |
| 2002/0023097 A1 | * | 2/2002 | Ripley | 707/200 |
| 2002/0059566 A1 | * | 5/2002 | Delcambre et al. | 717/146 |
| 2002/0083067 A1 | * | 6/2002 | Tamayo et al. | 707/100 |
| 2002/0194357 A1 | * | 12/2002 | Harris et al. | 709/232 |
| 2003/0120665 A1 | * | 6/2003 | Fox et al. | 707/100 |

OTHER PUBLICATIONS

IBM Technical Disclosure Bulletin, "Branch Set preserving Transformations of Hierarchical Data Structure", Dec. 1980, vol. 23, p. 3090–3094.*

* cited by examiner

*Primary Examiner*—Uyen Le
*Assistant Examiner*—Hanh Thai
(74) *Attorney, Agent, or Firm*—Baker Botts L.L.P.

(57) ABSTRACT

A computer-implemented method for mapping multiple source content schemas into a single target content schema. For each source schema to be mapped, a source class tree representing the source schema classes and a target class tree representing the target schema classes are provided for display to a user, input specifying one or more source properties within one or more source classes is received, one or more target properties within one or more target classes are determined for mapping to the source properties, and a schema map file including a mapping of the target properties to the source properties is generated. The source databases are determined. The schema map files are applied to generate information used for extracting the appropriate content from the source databases and for loading the extracted content into the target database.

25 Claims, 3 Drawing Sheets

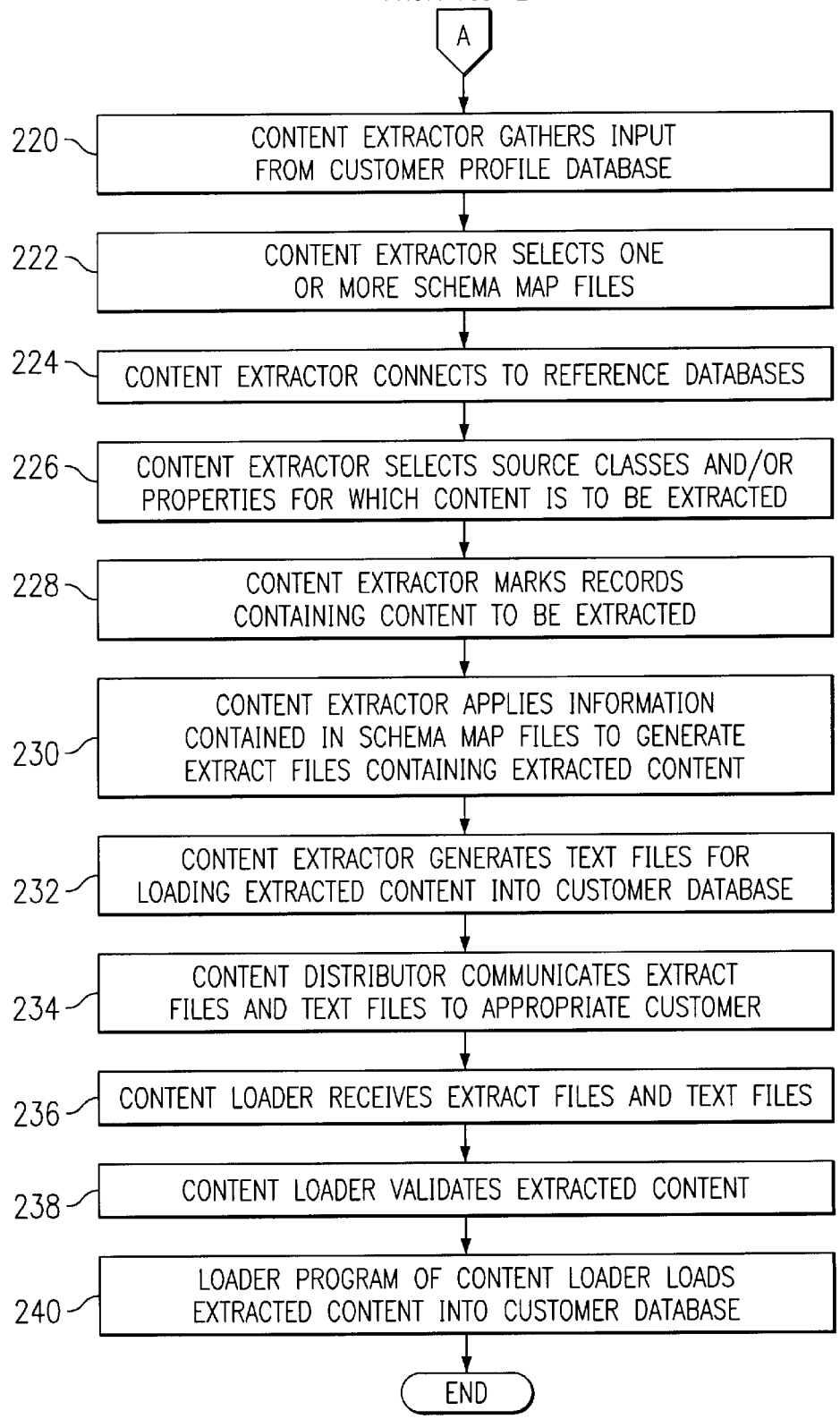

CONSOLIDATION OF MULTIPLE SOURCE CONTENT SCHEMAS INTO A SINGLE TARGET CONTENT SCHEMA

RELATED APPLICATIONS

This application claims priority under 35 U.S.C. § 119(e) of U.S. Provisional Application Serial No. 60/301,950, filed Jun. 28, 2001.

TECHNICAL FIELD OF THE INVENTION

The present invention relates in general to database applications and, more particularly, to consolidation of multiple source content schemas into a single target content schema.

BACKGROUND OF THE INVENTION

In electronic ("e-commerce") database applications, content such as product-related information may be organized according to schemas. Generally, a schema is an organizational structure for data. In a relational database, a schema may define the tables residing in the database, the rows and fields in each table, and the relationships between the rows and fields in different tables. In e-commerce database applications, a schema may include a set of product classes (which can be referred to as a "taxonomy") organized in a hierarchy, with each class being associated with a set of product features, characteristics, or other product attributes (which can be referred to as a "product ontology"). For example, writing pens can have different kinds of tips (e.g., ball point or felt tip, different tip sizes (e.g., fine, medium or broad), and different ink colors (e.g., blue, black or red). Accordingly, a schema can include a class corresponding to pens, which has a product ontology including tip type, tip size and color, or other appropriate attributes. Within a class, products may be defined by product attribute values (e.g., ball point, medium tip, blue ink). Product attribute values can include numbers, letters, figures, characters, symbols, or other suitable information for describing a product.

Existing database techniques for organizing and normalizing content (e.g., product-related information) use different schemas for different industry verticals, commodity domains, or other product classification structures. Consequently, if a user (e.g., customer or supplier) requires or uses content that can be classified in more than one product classification structure, the different schemas required for the content are maintained in separate databases. Although the resources expended in the past for maintaining different schemas in different databases may have been relatively low, given the ever-increasing number of e-commerce transactions being conducted, and the ever-increasing number of product searches being performed, resources required for maintaining separate such databases for use in evolving e-commerce applications continue to increase.

SUMMARY OF THE INVENTION

According to the present invention, disadvantages and problems associated with previous database applications may be reduced or eliminated.

In one aspect of the present invention, a computer-implemented method for mapping multiple source content schemas into a single target content schema includes receiving user input specifying one or more source schemas for mapping to a target schema. Each source schema is associated with a corresponding source database that stores content according to the source schema, each source schema having one or more source classes that each have one or more source properties. The target schema is associated with a corresponding database that can receive content extracted from one or more source databases and store the extracted content according to the target schema, the target schema having one or more target classes that each have one or more target properties. The method further includes, for each source schema to be mapped to the target schema, providing a source class tree representing the source schema classes and a target class tree representing the target schema classes for display to a user; receiving user input specifying one or more source properties within one or more source classes of the source schema, determining one or more target properties within one or more target classes of the target schema for mapping to the one or more source properties of the source schema, and generating a schema map file comprising a mapping of the one or more target properties of the target schema classes to the one or more source properties of the source schema classes. The method further includes accessing the schema map file for each source schema mapped to the target schema and, according to the one or more accessed schema map files, determining the one or more mapped source properties for which content is to be extracted from the one or more corresponding source databases. The method further includes applying the one or more schema map files to generate information used for extracting the content associated with the one or more mapped source properties and information used for loading the extracted content into the target database, extracting the content associated with the one or more mapped source properties from the one or more corresponding source databases, and loading the extracted content associated with the one or more mapped source properties into the target database according to the information for loading the extracted content.

Particular embodiments of the present invention may provide one or more technical advantages. For example, particular embodiments of the invention may enable a user to readily consolidate multiple source schemas associated with multiple corresponding source databases into a single target schema for a single corresponding target database. As such, particular embodiments of the invention may allow any enterprise to create one or more customized schemas from multiple domain-specific schemas, for example, schemas specific to particular industry verticals, commodity domains, or other product classification structures. In addition, as a result of the consolidation of schemas for multiple source databases into a schema for a single target database, resources previously required for maintenance of multiple databases may be substantially reduced. Particular embodiments of the invention may provide some, all, or none of these advantages. One or more other technical advantages may be readily apparent to one skilled in the art from the figures, description, and claims included herein.

BRIEF DESCRIPTION OF THE DRAWINGS

For a more complete understanding of the present invention and certain of its advantages, reference is made to the following descriptions, taken in conjunction with the accompanying drawings, in which.

DESCRIPTION OF EXAMPLE EMBODIMENTS

Figure 1:
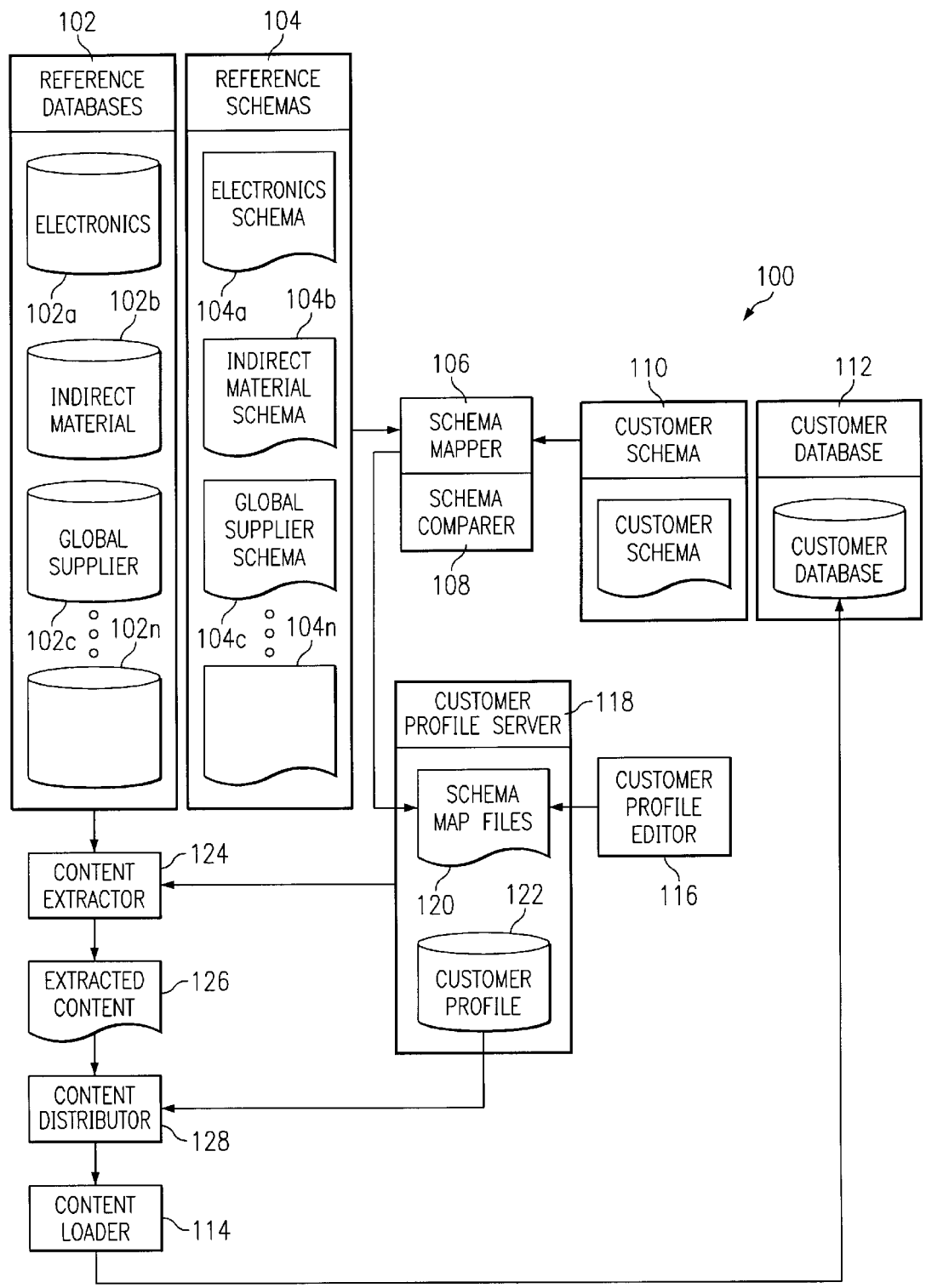
FIG. 1 illustrates an example system for consolidating multiple source content schemas into a single target content schema.

FIG. 1 illustrates an example system 100 for consolidating multiple source content schemas into a single target content schema. As used herein, as appropriate, the terms "content" and "data" are used interchangeably and are meant to encompass numerical data, alphanumeric text, images, or any other suitable content that may be stored in a database. The present invention may allow a user to create a consolidated schema based on multiple industry vertical, commodity domain, or other product classification schemas associated with multiple databases containing product-related content. Using mapping information generated when the consolidated schema is created, data from these multiple source databases may be extracted and loaded into a single target database in accordance with the consolidated schema. In a broad sense, the present invention may be used for any object relational database application in which it may be advantageous to create a single customized schema from multiple domain-specific schemas. Although the present invention may be used to map selected portions of multiple source schemas to a target schema, the present invention may also be used to map portions of a single source schema to a target schema, according to particular needs.

As a particular example, an automobile industry schema might include the following categories: (1) automotive-specific components (e.g., brakes, engine parts, etc.); (2) electronic components (e.g., processors, controllers, etc.); (3) consumables (e.g., sealants, paints, etc.); and (4) mechanical components (e.g., fasteners, bearings, etc.). An automotive Original Equipment Manufacturer (OEM), such as the FORD MOTOR COMPANY, will typically manufacture and provide its own automotive-specific components. On the other hand, automotive OEMs will typically procure other categories of components from suppliers (e.g., BOSCH, MOTOROLA, etc.) that specialize in manufacturing components in their particular categories. According to one embodiment of the present invention, an automotive OEM may create a single, consolidated, customized schema based on the multiple domain-specific schemas of its suppliers. The customized schema may be organized, for example, according to the OEM's specific production needs. The OEM may thereafter use the customized schema for making procurement decisions or for any other purpose. Although an automotive OEM is discussed as an example, the present invention contemplates any user in any industry or endeavor consolidating multiple source schemas into a single target schema according to its particular needs.

Although not explicitly shown, many of the components, functions, and tasks described below may be computer-implemented, each incorporating or executed by one or more appropriate computer systems at one or more locations. Each computer system may include one or more suitable input devices, output devices, mass storage media, processors, memory, or other components for receiving, processing, storing, and communicating information according to the operation of system 100. Where appropriate, each computer system may operate according to suitable input from any number of associated users. System 100 may include a number of reference databases 102a–102n (where "n" is any positive integer greater than "1") that store a number of corresponding reference schemas 104a–104n, respectively. Although databases are illustrated and described herein, the present invention contemplates any appropriate data storage components and arrangements for storing schemas and related product information, and use of the term "database" herein is meant to encompass all such components and arrangements as are appropriate. Depending on the implementation, components of system 100 may be wholly or partially integrated, wholly or partially distributed, or arranged in any other suitable manner. For example, in a particular embodiment, each reference database 102 is associated with a corresponding supplier and is geographically remote from the other reference databases 102 and from other components of system 100. Components of system 100 may be coupled, physically or logically, to one another in any suitable manner, for example, using one or more buses, local area networks (LANs), metropolitan area networks (MANs), wide area networks (WANs), a global computer network such as the Internet, or any other wireline, optical, wireless, or other links.

For illustrative purposes, it can be assumed that content (e.g., product-related data) associated with one or more collaborating entities (e.g., one or more suppliers of a particular customer) representing one or more industry verticals, commodity domains, or other product classification structures has been classified in schemas 104a–104n. For example, and not by way of limitation, electronics schema 104a may be organized in database 102a, indirect material schema 104b may be organized in database 102b, global supplier schema 104c may be organized in database 102c, and so on. Any suitable number of reference databases 102 and associated reference schemas 104 may exist within system 100.

System 100 may include a schema mapper 106 that supports mapping of schema data between multiple reference (i.e. source) schemas 104 associated with corresponding reference (i.e. source) databases 102 and a single customer (i.e. target) schema 110 associated with a customer (i.e. target) database 112. Schema mapper 106 may include one or more software processes or other components executed on one or more computer systems associated with one or more reference databases 102, with customer database 112, or with an intervening entity (located between reference databases 102 and customer database 112) such as an electronic marketplace or other network service provider. A "customer" may be any user of one or more reference schemas 104 for organizing and classifying content such as product-related data. Schema mapper 106 may generate one or more schema map files 120 (e.g., maintained in a customer profile database 122 that is associated with a customer profile server 118) based on a user-specified mapping of selected classes and/or properties between one or more reference schemas 102 and customer schema 110. For example, where a reference database 102 contains product-related information, each class of corresponding reference schema 104 may be associated with a product category or sub-category and each property for a particular class may be a product attribute for all products in the category or sub-category associated with the particular class. In one embodiment, schema mapper 106 may allow the user to view multiple reference schemas 104 within a single display, compare one or more of the viewed reference schemas 104 with a generated customer schema 110 (e.g., using an associated schema comparer 108), update schema map files 120 as appropriate, and request content from database 102 for storage in database 112 according to customer schema 110.

Depending on the particular database structures used for maintaining reference schemas 104 and customer schema 110, a user may provide suitable input information to generate viewable displays of one or more particular schemas, including one or more reference schemas 104, customer schema 110, or both one or more reference schemas 104 and customer schema 110. For example, if a particular schema to be displayed is maintained in a hierarchical database structure, suitable input information for generating a display of the schema may include an identifier for corresponding database (e.g., reference database 102 for a reference schema 104), a user name, and a user password. In one embodiment, in response to such input information, schema mapper 106 or another suitable component of system 100 accesses the database to retrieve data associated with a class tree for the schema. The retrieved class tree data may be used to generate a display of the class tree as a representation of the schema. Where appropriate, display of a class tree for a schema may be considered display of the schema. Schema mapper 106 may use hierarchical parent-child relationships set up in the database to generate the display of the class tree for the schema.

As another example, according to a file selection dialog, a user may specify a tree (e.g., tre) file corresponding to a particular schema to cause the schema to be displayed. In response to input information specifying a tree file for a schema, schema mapper 106 or another suitable component of system 100 may connect to a database corresponding to the schema (e.g., reference database 102 for reference schema 104) to retrieve data associated with a class tree for the schema. The retrieved class tree data may be used to generate a display of the class tree as a representation of the schema. In one embodiment, an example input format for retrieving schema data using a tree file selection dialog may include:

i2 Catalog Items| . . .
   Manufacturer Catalogs| . . .
     Manufacturer Parts| . . .

As yet another example, data model files may represent the tables used to generate a hierarchical database. Accordingly, a data model file selection dialog may be used to specify data model files corresponding to a particular schema that is to be displayed. In response to input information specifying data model files for a schema, schema mapper 106 or another suitable component of system 100 may connect to a database corresponding to the schema (e.g., reference database 102 for a reference schema 104) to retrieve data associated with a class tree for the schema. The retrieved class tree data may be used to generate a display of the class tree as a representation of the schema. In one embodiment, suitable types of data model files may include, without limitation:

| | |
|---|---|
| Class file | <base name>_classes.psv |
| Class link file | <base name>_classlink.psv |
| Class property file | <base name>_classprop.psv |
| Pointer file | <base name>_pcppvc.psv |
| Uom file | <base name>_uom.psv |
| Ldd file | <base name>_ldd.psv |

For example, if a user's base name is "MRSC", then associated file names may be: MRSC_classes.psv; MRSC_classlink.psv; MRSC classprop.psv; MRSC cppvc.psv; MRSC_uom.psv; and MRSC_ldd.psv. In one embodiment, class files and class link files may be required as inputs, while other types of files are optional. Example formats for these example data model files may include, without limitation:

Classes:
   Class name|Class type|Max objects|Class DBname|Class Description| . . .

Class Link:
   Parent Class|Child Class|Display Order|

Class Properties:
   Leaf Class|Parameters|Display Order|Data Type|Length|Precision Units|
   Units Symbol|EVV or RVV|Primary Key|Comments|Property DB Name|
   LDD length| . . .

Pointers:
   Pointer Owner Class|Pointer Name|Pointer Valid Class|Relational
   Meaning|Is Value Required|Pointer DB Name| . . .

Uom:
   Uom Name|Uom Display Symbol|Uom Description|

Ldd:
   Logical Data Type Name|Dbms Data Type|Dbms Data Type Length|Data
   Storage Precision|Description|

To select multiple reference schemas 104 for display, a user may repeat the steps described above for selecting a particular schema, providing a schema identifier for each reference schema 104 selected and generating multiple class trees as the sources for the mapping to target schema 110.

Once a user has selected a reference schema 104 and a customer schema 110 for mapping, schema mapper 106 or another component of system 100 may allow the user to view the reference schema 104 and customer schema 110 within two separate windows in a single display and, using conventional graphical user interface (GUI) operations, to expand the class tree within each window as necessary to view the one or more properties for each class. In response to the user selecting one or more source classes and/or properties of a reference schema 104, schema mapper 106 may perform an "auto search" or other operation to "highlight" or otherwise identify one or more target classes and/or properties of customer schema 110 corresponding to the one or more selected source classes and/or properties. Once the user has identified one or more classes and/or properties for mapping, the user may select a "map" function associated with schema mapper 106 to generate a mapping of the identified customer schema classes and/or properties to the corresponding reference schema class and/or property, respectively. The user may repeat these steps to map any additional classes and/or properties as desired, based on the same reference schema 104 or on one or more other reference schemas 104. In one embodiment, schema mapper 106 may allow a user to map an entire selected source class associated with a reference schema 104, including all properties of the class, to a target class associated with customer schema 110. For example, this may be desirable where the user wishes to map all properties of a class rather than individually mapping one or more selected properties of a class.

If any source fields in a reference database 102 are selected for mapping, then schema mapper 106 may automatically select the matching target fields in customer database 112 for the selected source fields within reference database 102 for mapping, generate an appropriate mapping of the source fields to the target fields, and update schema map file 120. Schema mapper 106 may rely on pointers in mapping source fields to target fields. A pointer originates from one class in a schema and points to the same or another valid class in the same schema. In general, a pointer will point to a location where the data is actually stored. For example, a class called "Part Info" might contain part-related information such as part number, price, lead time, etc., and a class called "Supplier Info" might contain supplier-related information such as the supplier name, supplier address, etc. The "Part Info" class might in this example have a "Supplier" pointer pointing to the "Supplier Info" class. The pointer may display the one or more primary keys of the valid class to which it points. If the valid class primary key is itself a pointer then the pointer may be referred to as a cascaded (i.e. multi-level) pointer. In a particular embodiment, to map a pointer, the user selects a valid class primary key displayed for a pointer. In response, schema mapper 106 establishes the appropriate mapping between the source fields in the applicable reference database 102 and the target fields in customer database 112. Cascaded pointers may be mapped in a similar manner.

A user may select multiple source properties from a reference schema 104 for mapping and build an expression that maps the source properties to a single target property of customer schema 110. As just an example, if a user has defined a "size" property for a particular target class and a reference schema 104 instead contains "length" and "width" source properties, then schema mapper 106 may allow the user to build the expression "length×width<−>size" to support data extraction from corresponding reference database 102 for the "size" target property. The present invention contemplates any suitable user-defined expression for mapping one or more source properties to a target property.

In one embodiment, if a user desires to filter content from mapped classes and/or properties, the user may select a "filter" function associated with the schema mapper 106 to define one or more filters for use in content selection during content extraction from reference databases 102 (described below). Filters are constructed based on reference schema properties. For example, if the user wants to extract data from an "Inductor" class where the "Core Material" is "Brass," then the user may apply a filter such as "Core Material='Brass'". Schema map files 120 may be maintained by adding, deleting, or updating classes and/or properties for existing schema map files 120 or by adding, deleting, or updating filters. A wizard or other suitable GUI associated with the filter function may help the user in establishing or modifying such filters. Schema mapper 106 may incorporate filters applicable to a reference schema 104 into one or more schema map files 120 corresponding to the reference schema 104.

System 100 may include a customer profile editor 116 that allows license arrangements to be established with respect to product-related information or other content contained in reference databases 102. For example, customer profile editor 116 may be used to define products, add or delete customers, and establish a license arrangement for a customer with respect to content related to one or more specific products. Customer profile editor 116 may maintain a customer profile database 122 that contains pertinent information concerning each customer having access to content within one or more reference databases 102. For example, information maintained in customer profile database 122 for a customer may identify products purchased or subscribed to by the customer, license arrangements for the customer, the product for which information was most recently sent to the customer, or any other appropriate information. Customer-related information in customer profile database 122 may be used subsequently for extracting content from one or more reference databases 102 and loading extracted content into customer database 112.

Customer profile editor 116 may includes one or more software processes or other components executed on or more computer systems associated with one or more reference databases 102, with customer database 112, or with an intervening entity (located between reference databases 102 and customer database 112) such as an electronic marketplace or other network service provider. In one embodiment, the schema map files 120 and customer profile database 122 are maintained at a customer profile server 118 that operates at a suitable location in system 100. For example, a single profile server 118 that is associated with all reference databases 102 might be supported at an electronic marketplace or other network service provider accessible to multiple customers over the Internet. As an example alternative, a dedicated profile server 118 may instead be associated with each reference database 102. The present invention contemplates customer profile server 118 and associated schema map files and customer profile database 122 being supported at any one or more locations within system 100, according to the particular implementation.

System 100 may include a content extractor 124 that gathers appropriate input from customer profile database 122 and selects one or more schema map files 120 created by schema mapper 106. Content extractor 124 may include one or more software processes or other components executed on or more computer systems associated with one or more reference databases 102 or with an intervening entity (located between reference databases 102 and customer database 112) such as an electronic marketplace or other network service provider. As described more fully above, the schema mapper 106 may provide information about reference databases 102 and classes and/or properties to be extracted from reference databases 102, and the customer profile in customer profile database 122 may provide license information and information specifying how frequently updates should be performed for the customer.

In one embodiment, depending on a particular customer license arrangement, content extractor 124 may connect to one or more necessary reference databases 102, select the source classes and/or properties for which content is to be extracted, mark the records containing the content to be extracted from each reference database 102, and applies information contained in one or more schema map files 120 (including any applicable filters) to generate extract files by extracting appropriate data from reference databases 102. The extract files contain the data for the mapped classes and their properties and pointers. Content extractor 124 may use the information relating to reference pointers and primary keys available in one or more schema map files 120, extraction of pointer information being performed similar to property extraction as described above. Content extractor 124 may also use one or more expressions (described above) in one or more schema map files 120.

In addition, content extractor 124 may generate one or more appropriate text files with specified field separators and any required header information, information about the class structure, property structure, and hierarchy structure that may be needed for loading extracted content into customer database 112, and pre-requisites for loading extracted content into customer database 112 (e.g., space requirements, previous versions of content used, etc.). Content extractor 124 may use meta-model files in performing one or more of the above operations.

System 100 may include a content distributor 128 that communicates extract files containing content extracted from reference databases 102 and appropriate text files for loading the extracted content, incrementally or otherwise, to the one or more customers that have subscribed to the extracted content. Content distributor 128 may include one or more software processes or other components executed on or more computer systems associated with one or more reference databases 102, with customer database 112, or with an intervening entity (located between reference databases 102 and customer database 112) such as an electronic marketplace or other network service provider. For example, the content distributor 128 may retrieve from profile database 122, for each such customer, a customer e-mail address, FTP site information (e.g., if a customer wants to have extracted content 126 "pushed" to its server), a customer server address, customer login information, or other appropriate customer profile information. According to the retrieved customer profile information, content distributor 128 may communicate extracted content 126 to the customers entitled to receive extracted content 126 (e.g., according to license arrangements). The content distributor 128 may communicate content extracted from one or more reference databases 102 to one or more customers on a periodic basis (e.g., daily, weekly, monthly, quarterly), on demand, in response to an event, or in any other suitable manner.

System 100 may include a content loader 114 that receives the extract files and text files generated by content extractor 124 and performs suitable validation tasks on the extracted content before loading the extracted content into the customer database 112. Appropriate validation tasks may include, for example, determining the availability of storage space in customer database 112 for loading extracted content, determining the validity of the class structure of customer database 112 in view of class information in extracted content to be loaded, determining the validity of the class structure of customer database 112 with respect to availability of previously loaded content, determining the validity of any supporting information (e.g., units of measurement, logical data definitions, values for properties, etc.), or other appropriate validation tasks.

After content loader 114 has completed such validation, a "loader" program associated with content loader 114 may be executed to load extracted content into customer database 112 on a class by class or other suitable basis. For example, content for each individual class may be loaded sequentially in the order in which it was extracted. In the alternative, content loading for two or more classes may overlap in whole or in part. Content loader 114 may allow a user to monitor the success or failure of content loading for each class, for example, using an associated GUI. Preferably, for data integrity purposes, a scheduling feature of content loader 114 prevents the customer from interacting with customer database 112 while content is being loading. Content loader 114 may include one or more software processes or other components executed on or more computer systems associated with customer database 112 or with an intervening entity (located between reference databases 102 and customer database 112) such as an electronic marketplace or other network service provider.

Figure 2A:
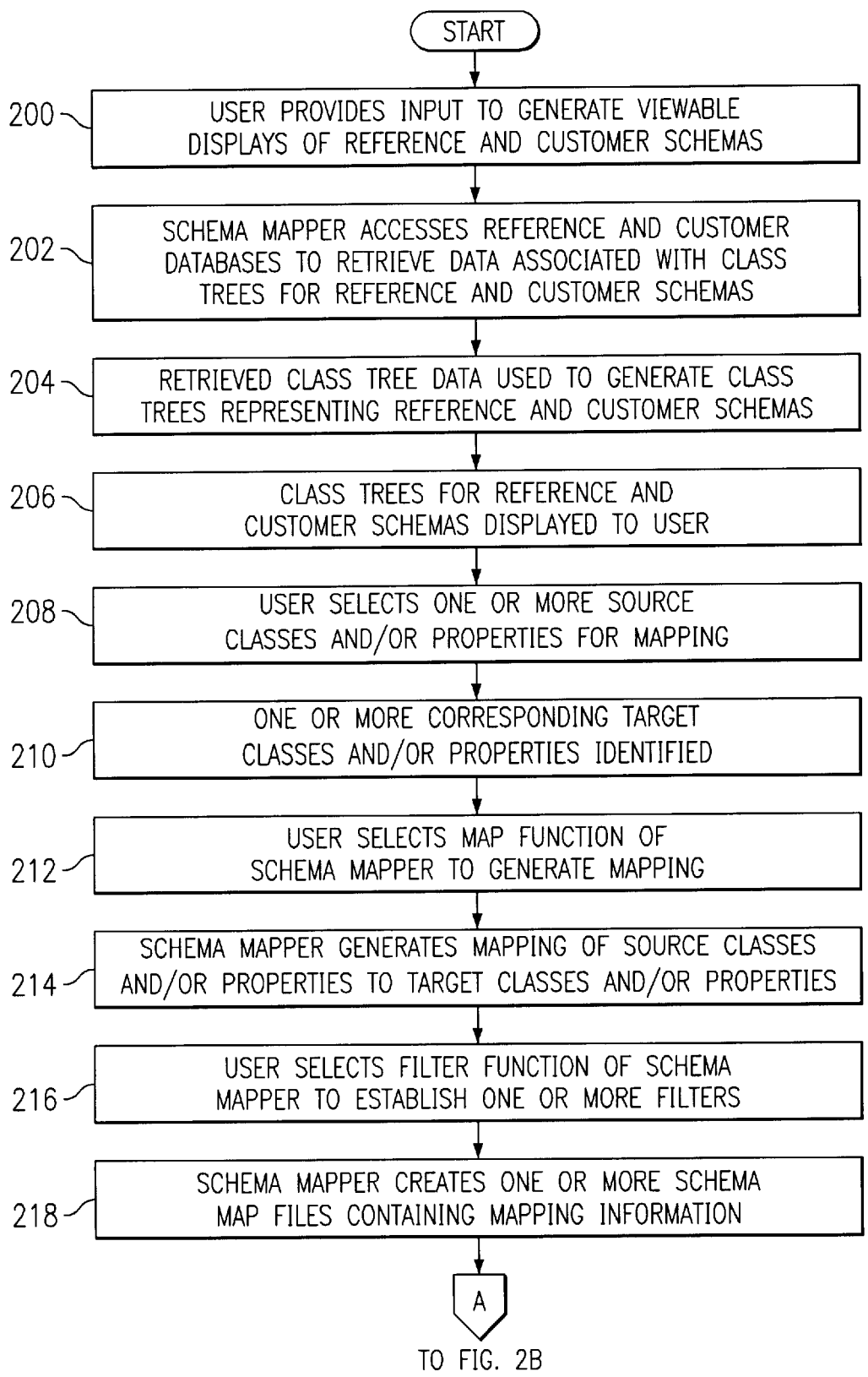
FIG. 2 illustrates an example method for consolidating multiple source content schemas into a single target content schema.

FIG. 2 illustrates an example method for consolidating multiple source content schemas into a single target content schema. The method begins at step 200, where a user provides suitable input to generate viewable displays of one or more reference schemas 104 and customer schema 110 to which the one or more reference schemas 104 are to be mapped. As described above, where a schema is maintained in a hierarchical database structure, such input information might include an identifier for a corresponding database (e.g., a reference database 102 for a reference schema 104), a user name, and a user password. As another example, according to a tree file selection dialog, a user might specify a tree file corresponding to a schema to cause the schema to be displayed. As yet another example, according to a data model file selection dialog, a user might specify data model files corresponding to the schema to be displayed. The present invention contemplates any input information for causing one or more reference schemas 104 and customer schema 110 to be displayed to a user for subsequent evaluation.

At step 202, schema mapper 106 accesses the appropriate reference databases 102 and customer database 110 to retrieve data associated with class trees for each specified reference schema 104 and for customer schema 110. The retrieved class tree data is used to generate class trees representing each reference schema 104 and target schema 110 at step 204 and, at step 206, the class trees are displayed to the user as representations of the schemas. As described above, the user may be allowed to view each schema within a separate display window and, according to conventional GUI operations, to expand the class tree in each window as necessary to view the one or more properties associated with each class. At step 208, the user selects one or more source classes and/or properties of a reference schema 104 for mapping. In response, at step 210, schema mapper 106 may perform an "auto search" or other operation to identify one or more target classes and/or properties of customer schema 110 corresponding to each selected source class and/or property. Once the user has identified one or more classes and/or properties for mapping, at step 212 the user may select a "map" function associated with schema mapper 106 to generate a mapping of the identified customer schema classes and/or properties to corresponding reference schema classes and/or properties, respectively. Schema mapper 106 generates the mapping at step 214. These steps may be repeated as needed to map any number of classes and/or properties as desired.

As described above, schema mapper 106 may allow a user to map an entire selected source class of a reference schema 104, including all properties of the class, to a target class associated with customer schema 110. Also as described above, mapping may include schema mapper 106 automatically selecting target fields in customer database 112 matching selected source fields in a reference database 102, using pointers associated with primary keys or otherwise. Mapping may include a user selecting one or more source properties of a reference schema 104 to build an expression that maps the source properties to a single target property of customer schema 110. At step 216, as part of the mapping operation or as a separate operation, a user may establish one or more filters for use in selecting content for extraction from reference databases 102. At step 218, schema mapper 106 creates one or more schema map files 102, for example, each corresponding to a particular reference schema 104 being mapped and containing all mappings, filters, and other suitable information needed to extract the appropriate content from the associated reference database 102.

At step 220, content extractor 124 gathers appropriate input from customer profile database 122 needed for extracting content from reference databases 102 and, at step 222, selects one or more appropriate schema map files 120 created by schema mapper 106. Content extractor connects to appropriate reference databases 102 at step 224, selects source classes and/or properties for which content is to be extracted at step 226, marks records containing content to be extracted from each reference database 102 at step 228, and applies information contained in the schema map files 120 at step 230 to generate extract files by extracting appropriate data from reference databases 102. At step 232, content extractor generates suitable text files containing information used for loading the extracted content into customer database 112. At step 234, according to information stored in customer profile database 122, content distributor 128 communicates the appropriate extract files and text files to the one or more customers that have subscribed to the extracted content. Content loader 114 receives the extract files and text files at step 236 and validates the extracted content at step 238. At step 240, the loader program of content loader 114 loads the extracted content into customer database 112, and the method ends. One or more operations described in connection with this example method may be performed as many times and in any suitable order as needed to consolidate multiple reference schemas 104 into a single customer schema 110. Furthermore, although consolidation of reference schemas 104 into a single customer schema 110 is described, those skilled in the art will appreciate that the single customer schema 110 may be different, perhaps being associated with a different customer, depending on the user and the reference schemas 104 that are selected for consolidation.

Although example embodiments of the present invention are illustrated in the accompanying drawings and described in the above description, it will be understood that the invention is not limited to the embodiments disclosed, but is capable of numerous rearrangements, modifications and substitutions without departing from the spirit of the invention as set forth and defined by the following claims.

What is claimed is:

1. A computer-implemented system for mapping a plurality of source content schemas into a single target content schema, comprising:

a computer-implemented schema mapper coupled to a plurality of computer-implemented source databases and to a computer-implemented target database, each computer-implemented source database storing content according to a corresponding source schema comprising one or more source classes that each comprises one or more source properties, the computer-implemented target database operable to receive content extracted from one or more computer-implemented source databases and store the extracted content according to a corresponding target schema comprising one or more target classes that each comprises one or more target properties, the computer-implemented schema mapper operable to, for each source schema to be mapped to the target schema:

receive user input specifying the source schema for mapping to a target schema;

provide a source class tree representing the source schema classes and a target class tree representing the target schema classes for display to a user;

receive user input specifying one or more source properties within one or more source classes of the source schema;

determine one or more target properties within one or more target classes of the target schema for mapping to the one or more source properties of the source schema; and generate a schema map file comprising a mapping of the one or more target properties of the target schema classes to the one or more source properties of the source schema classes;

a computer-implemented content extractor coupled to the plurality of computer-implemented source databases, the computer-implemented content extractor operable to:

access the schema map file for each source schema mapped to the target schema;

according to the one or more accessed schema map files, determine the one or more mapped source properties for which content is to be extracted from the one or more corresponding computer-implemented source databases;

apply the one or more schema map files to generate information used for extracting the content associated with the one or more mapped source properties and information used for loading the extracted content into the computer-implemented target database; and extract the content associated with the one or more mapped source properties from the one or more corresponding computer-implemented source databases; and a computer-implemented content loader coupled to the computer-implemented content extractor and to the computer-implemented target database, the computer-implemented content loader operable to load the extracted content associated with the one or more mapped source properties into the computer-implemented target database according to the information for loading the extracted content generated by the computer-implemented content extractor.

2. The system of claim 1, wherein the schema mapper is operable to:

receive user input specifying one or more source classes of a particular source schema, specification of a source class automatically specifying all source properties within the specified source class; and determine one or more target classes of the target schema for mapping to the one or more source classes of the particular source schema.

3. The system of claim 1, wherein:

the schema mapper is operable to receive user input defining an expression for mapping multiple source properties of a particular source schema to a single target property of the target schema; and the content extractor is operable to use the expression in extracting content from the source database corresponding to the particular source schema for loading into the target database.

4. The system of claim 1, wherein:

the schema mapper is operable to receive user input specifying one or more filtering conditions for filtering the content associated with the one or more mapped source properties; and the content extractor is operable to extract the content associated with the one or more mapped source properties from one or more corresponding source databases according to the specified filtering conditions.

5. The system of claim 1, wherein the schema mapper is operable to allow a user to modify a schema map file subsequent to its creation by at least one of the following:

adding one or more new mapped properties;

deleting one or more existing mapped properties; and updating one or more existing mapped properties.

6. The system of claim 1, wherein the schema mapper is operable to:

receive user input specifying one or more source fields in a particular source database corresponding to a particular source schema;

receive user input selecting one or more primary keys corresponding to the one or more specified source fields, each primary key being associated with a pointer from the corresponding source class to another source class within the source schema; and automatically map the one or more source fields to one or more corresponding target fields in the target database according to the one or more pointers associated with the one or more selected primary keys.

7. The system of claim 1, wherein content associated with each source schema comprises product-related data and each source schema is associated with a corresponding industry vertical, commodity domain, or other product classification structure.

8. The system of claim 1, further comprising a content distributor that is operable to receive the extracted content from the content extractor and communicate the extracted content, according to established license arrangements, to one or more customers that have subscribed to receive the content.

9. A computer-implemented method for mapping a plurality of source content schemas into a single target content schema, comprising:

receiving user input specifying one or more source schemas for mapping to a target schema, each source schema being associated with a corresponding source database that stores content according to the source schema, each source schema comprising one or more source classes that each comprises one or more source properties, the target schema being associated with a corresponding database that is operable to receive content extracted from one or more source databases and store the extracted content according to the target schema, the target schema comprising one or more target classes that each comprises one or more target properties;

for each source schema to be mapped to the target schema:

providing a source class tree representing the source schema classes and a target class tree representing the target schema classes for display to a user;

receiving user input specifying one or more source properties within one or more source classes of the source schema;

determining one or more target properties within one or more target classes of the target schema for mapping to the one or more source properties of the source schema; and generating a schema map file comprising a mapping of the one or more target properties of the target schema classes to the one or more source properties of the source schema classes;

accessing the schema map file for each source schema mapped to the target schema;

according to the one or more accessed schema map files, determining the one or more mapped source properties for which content is to be extracted from the one or more corresponding source databases;

applying the one or more schema map files to generate information used for extracting the content associated with the one or more mapped source properties and information used for loading the extracted content into the target database;

extracting the content associated with the one or more mapped source properties from the one or more corresponding source databases; and loading the extracted content associated with the one or more mapped source properties into the target database according to the information for loading the extracted content.

10. The method of claim 9, further comprising:

receiving user input specifying one or more source classes of a particular source schema, specification of a source class automatically specifying all source properties within the specified source class; and determining one or more target classes of the target schema for mapping to the one or more source classes of the particular source schema.

11. The method of claim 9, further comprising:

receiving user input defining an expression for mapping multiple source properties of a particular source schema to a single target property of the target schema; and using the expression in extracting content from the source database corresponding to the particular source schema for loading into the target database.

12. The method of claim 9, further comprising:

receiving user input specifying one or more filtering conditions for filtering the content associated with the one or more mapped source properties; and extracting the content associated with the one or more mapped source properties from one or more corresponding source databases according to the specified filtering conditions.

13. The method of claim 9, further comprising allowing a user to modify a schema map file subsequent to its creation by at least one of the following:

adding one or more new mapped properties;

deleting one or more existing mapped properties; and updating one or more existing mapped properties.

14. The method of claim 9, further comprising:

receiving user input specifying one or more source fields in a particular source database corresponding to a particular source schema;

receiving user input selecting one or more primary keys corresponding to the one or more specified source fields, each primary key being associated with a pointer from the corresponding source class to another source class within the source schema; and automatically mapping the one or more source fields to one or more corresponding target fields in the target database according to the one or more pointers associated with the one or more selected primary keys.

15. The method of claim 9, wherein content associated with each source schema comprises product-related data and each source schema is associated with a corresponding industry vertical, commodity domain, or other product classification structure.

16. The method of claim 9, further comprising communicating the extracted content, according to established license arrangements, to one or more customers that have subscribed to receive the content.

17. Software for mapping a plurality of source content schemas into a single target content schema, the software being embodied in computer-readable media and when executed operable to:

receive user input specifying one or more source schemas for mapping to a target schema, each source schema being associated with a corresponding source database that stores content according to the source schema, each source schema comprising one or more source classes that each comprises one or more source properties, the target schema being associated with a corresponding database that is operable to receive content extracted from one or more source databases and store the extracted content according to the target schema, the target schema comprising one or more target classes that each comprises one or more target properties;

for each source schema to be mapped to the target schema:
provide a source class tree representing the source schema classes and a target class tree representing the target schema classes for display to a user;
receive user input specifying one or more source properties within one or more source classes of the source schema;
determine one or more target properties within one or more target classes of the target schema for mapping to the one or more source properties of the source schema; and
generate a schema map file comprising a mapping of the one or more target properties of the target schema classes to the one or more source properties of the source schema classes;

access the schema map file for each source schema mapped to the target schema;

according to the one or more accessed schema map files, determine the one or more mapped source properties for which content is to be extracted from the one or more corresponding source databases;

apply the one or more schema map files to generate information used for extracting the content associated with the one or more mapped source properties and information used for loading the extracted content into the target database;

extract the content associated with the one or more mapped source properties from the one or more corresponding source databases; and load the extracted content associated with the one or more mapped source properties into the target database according to the information for loading the extracted content.

18. The software of claim 17, further operable to:
receive user input specifying one or more source classes of a particular source schema, specification of a source class automatically specifying all source properties within the specified source class; and
determine one or more target classes of the target schema for mapping to the one or more source classes of the particular source schema.

19. The software of claim 17, further operable to:
receive user input defining an expression for mapping multiple source properties of a particular source schema to a single target property of the target schema; and
use the expression in extracting content from the source database corresponding to the particular source schema for loading into the target database.

20. The software of claim 17, further operable to:
receive user input specifying one or more filtering conditions for filtering the content associated with the one or more mapped source properties; and
extract the content associated with the one or more mapped source properties from one or more corresponding source databases according to the specified filtering conditions.

21. The software of claim 17, further operable to allow a user to modify a schema map file subsequent to its creation by at least one of the following:
adding one or more new mapped properties;
deleting one or more existing mapped properties; and
updating one or more existing mapped properties.

22. The software of claim 17, further operable to:
receive user input specifying one or more source fields in a particular source database corresponding to a particular source schema;
receive user input selecting one or more primary keys corresponding to the one or more specified source fields, each primary key being associated with a pointer from the corresponding source class to another source class within the source schema; and
automatically map the one or more source fields to one or more corresponding target fields in the target database according to the one or more pointers associated with the one or more selected primary keys.

23. The software of claim 17, wherein content associated with each source schema comprises product-related data and each source schema is associated with a corresponding industry vertical, commodity domain, or other product classification structure.

24. The software of claim 17, further operable to communicate the extracted content, according to established license arrangements, to one or more customers that have subscribed to receive the content.

25. A computer-implemented system for mapping a plurality of source content schemas into a single target content schema, comprising:
means for receiving user input specifying one or more source schemas for mapping to a target schema, each source schema being associated with a corresponding computer-implemented source database that stores content according to the source schema, each source schema comprising one or more source classes that each comprises one or more source properties, the target schema being associated with a corresponding computer-implemented database that is operable to receive content extracted from one or more computer-implemented source databases and store the extracted content according to the target schema, the target schema comprising one or more target classes that each comprises one or more target properties;
means for providing, for each source schema to be mapped to the target schema, a source class tree representing the source schema classes and a target class tree representing the target schema classes for display to a user;
means for receiving, for each source schema to be mapped to the target schema, user input specifying one or more source properties within one or more source classes of the source schema;
means for determining, for each source schema to be mapped to the target schema, one or more target properties within one or more target classes of the target schema for mapping to the one or more source properties of the source schema;
means for generating, for each source schema to be mapped to the target schema, a schema map file comprising a mapping of the one or more target properties of the target schema classes to the one or more source properties of the source schema classes;
means for accessing the schema map file for each source schema mapped to the target schema;

means for according to the one or more accessed schema map files, determining the one or more mapped source properties for which content is to be extracted from the one or more corresponding computer-implemented source databases;

means for applying the one or more schema map files to generate information used for extracting the content associated with the one or more mapped source properties and information used for loading the extracted content into the computer-implemented target database;

means for extracting the content associated with the one or more mapped source properties from the one or more corresponding computer-implemented source databases; and means for loading the extracted content associated with the one or more mapped source properties into the computer-implemented target database according to the information for loading the extracted content.

* * * * *